N. W. HARTMAN.
MOTOR CAR WINDLASSING TACKLE.
APPLICATION FILED MAR. 16, 1916.
1,333,755.
Patented Mar. 16, 1920.
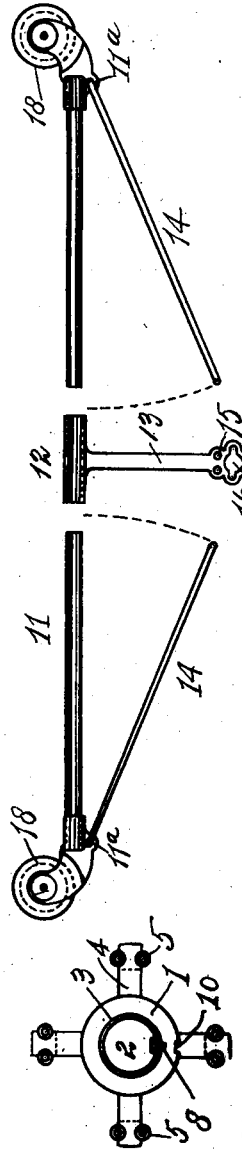
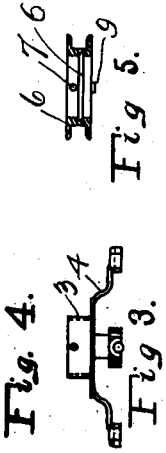
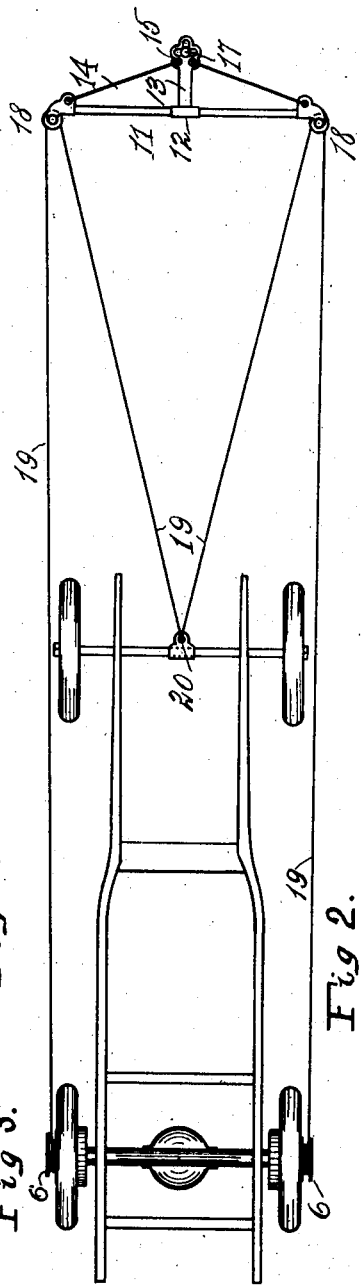
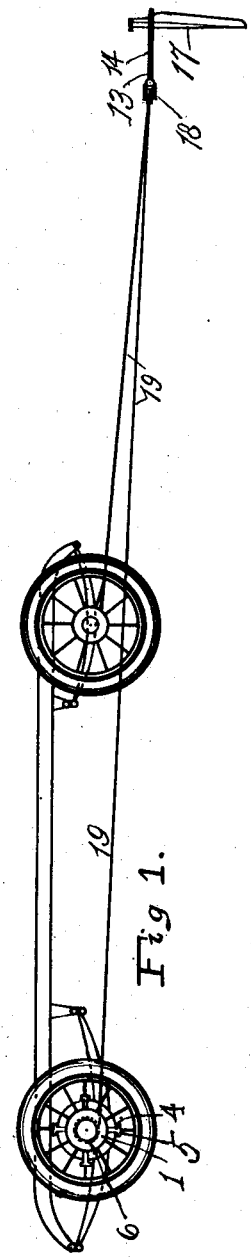
Inventor:
Noble W. Hartman,
By Hixon Hall, Atty.

UNITED STATES PATENT OFFICE.

NOBLE W. HARTMAN, OF TOLEDO, OHIO.

MOTOR-CAR WINDLASSING-TACKLE.

1,333,755.  Specification of Letters Patent.  Patented Mar. 16, 1920.

Application filed March 16, 1916. Serial No. 84,534.

*To all whom it may concern:*

Be it known that I, NOBLE W. HARTMAN, a citizen of the United States, residing at Toledo, in the county of Lucas and State of Ohio, have invented certain new and useful Improvements in Motor-Car Windlassing-Tackle; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In touring with automobiles a most fruitful source of trouble and annoyance and loss of time, as well as danger to the machine, is the stalling of the machine in ditches, ruts, deep mud and other places where the driving wheels can no longer propel the machine. My invention is designed to largely if not completely guard against such mishap by providing a device for utilizing the whole power of the engine of the automobile for pulling the machine forward, without at all relying upon the tractive effect of the driving wheels. More particularly, my invention is designed to furnish a stong, light, inexpensive anchor and windlassing-tackle which may be readily assembled and placed in operative position and relation and which may be quickly disconnected and packed in such small space that it may, without inconvenience, be stowed and carried upon the machine.

To these ends, my device consists of the construction and arrangement of parts hereinafter described, and shown and illustrated in the accompanying drawings, in which—

Figure 1 is a side-elevation of an automobile chassis having my device operatively connected therewith; Fig. 2, a top plan-view of the same; Fig. 3, a top plan-view of one of the "spiders" hereinafter referred to, adapted for engagement with the hub and spokes of the driving wheels of the machine; Fig. 4, a side-elevation of the same; Fig. 5, a transverse sectional plan of one of the detachable spools hereinafter referred to, and Fig. 6, a plan-view, partly in section, of the anchor-bar and its attachments hereinafter referred to, with the parts disconnected to illustrate the manner of separating the several parts of the anchor-bar to permit the stowing of the same in small space.

Like numerals of reference indicate like parts throughout the drawings.

In the drawings, 1 is a plate having therein a central opening 2, surrounded by an outstanding ring or flange 3. The plate has radial arms 4, in the present instance four, the arms being provided with clips 5 at their outer extremities adapted for engagement with the spokes of the rear driving wheels of an automobile. 6 is a pulley or spool which fits with a snug fit upon the outstanding flange 3 and which is provided with a hole 7 adapted to receive a spring-pin 8 carried by the flange 3. The spool 6 also has a lug 9 which, when the spool is in place, engages a notch 10 in the edge of the plate 1, so that when the pin and its hole and the lug and its notch are properly engaged, the spider and the spool must together revolve with the driving wheel. The spool has an interior circumferential groove $6^a$. Of these devices just described there are two, one for each of the driving wheels.

11 is an anchor-bar consisting of two equal parts, preferably tubular, the adjacent ends of which fit into a sleeve 12 formed at the rear end of the forwardly projecting bar 13. 14—14 are brace-rods connected at their outer ends by a swiveled connection, as at $11^a$, to the outer ends of the bars 11 and connected by means of downwardly turned hooks formed at their adjacent ends with eyes 15 at the forward end of the bar 13. It will be seen that when the parts 11—11, 13 and 14—14 are assembled as indicated they together form a light but strong trussed member. The forward end of the bar 13 has vertically therethrough an opening 16 for the reception of a pin or stake 17, the preferred form of which, in cross-section, is indicated by the outline of the opening 16 illustrated in Fig. 6. At each end of the anchor-bar 11 is a small horizontally disposed sheave 18. 19 is a rope, preferably a light, strong, flexible steel wire cable, in two lengths, attached, as at 20, to the forward axle, or to some other suitable part of the forward part of the machine, and leads forwardly in two diverging branches to and around the sheaves 18, which are spaced farther apart than the width of the tread of the machine, the two branches of the cable leading thence back to and around the spools 6 at opposite sides of the car.

It will now be obvious that if the bar 11 be suitably anchored, the rotation of the rear wheels will wind the cable upon the spools 6 and that the car will be powerfully pulled forward. Owing to the comparatively small diameter of the spools and the compounding of the spools and the pulleys, the mechanical power developed is sufficient to extract a car from difficulties where usual methods are inadequate.

Ordinarily the "spiders" will not be attached to the driving wheels, but on tours and on roads where bad spots are likely to be encountered they may be left in place. When not in use the sections of the bar 11 are withdrawn from the sleeve 12, and the brace-rods 14 are folded upon the bar-sections 11. The cable is detached from the point 20, and at each side of the machine the pin 8 is withdrawn from the hole 7, the spool is partly withdrawn from the flange 3 and the spring-pin 8 is permitted to engage the slot 6ª. Now the spool may be rotated so that its section of cable may be wound upon or unwound from the spool while the spool is thus conveniently supported for rotation on its bearing 3. The spools 6 are next disengaged from the flanges 3, and these parts with the cable and anchoring stake or peg,—and, if desired, the "spiders,"—may be closely packed in a suitable case, or, preferably, a stout canvas bag, and may be snugly stowed under a seat or on the running board, or slung with the spare tire, as may be desired.

Having described my invention, what I claim and desire to secure by Letters Patent, is—

In combination with an automobile, an apparatus comprising, in combination, a transversely extended anchorage having at each end a sheave, on each of the rear driving wheels of the automobile detachable winding drums, a cable leading from said winding drums to and around said sheaves, and means for securing such cable midway of its length to the forward part of the automobile.

In testimony whereof I affix my signature in presence of two witnesses.

NOBLE W. HARTMAN.

Witnesses:
GERTRUDE BRACKER,
JOHN H. JAMESON.